C. S. APPLAS.
VEHICLE TOP SUPPORT AND HOLDER.
APPLICATION FILED FEB. 25, 1913.
1,097,159.
Patented May 19, 1914.
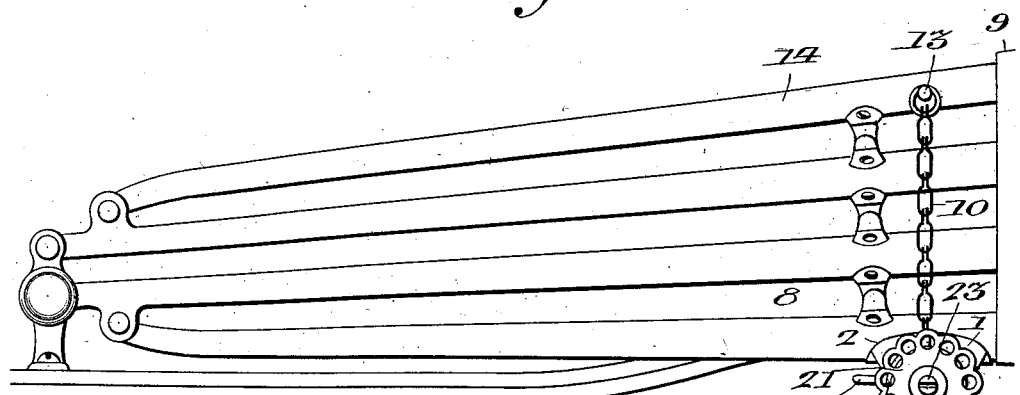
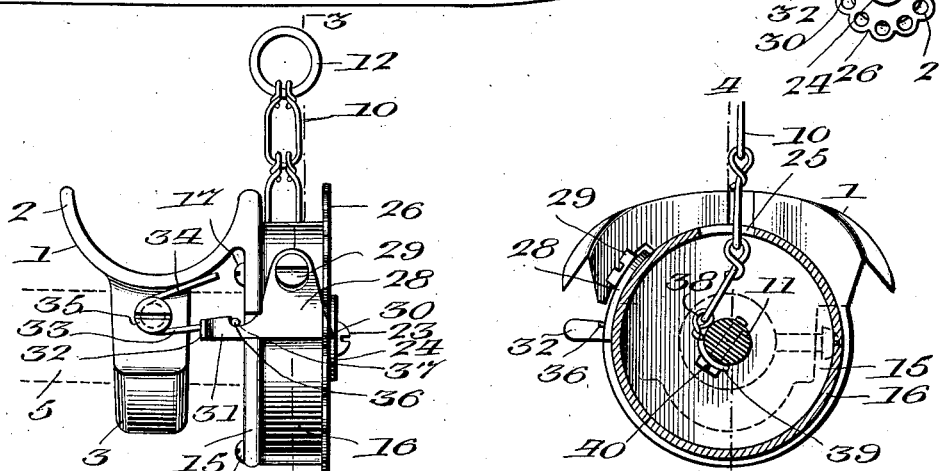
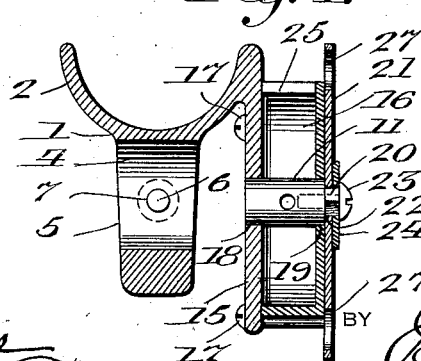
Clarence S. Applas
INVENTOR
WITNESSES
ATTORNEY

UNITED STATES PATENT OFFICE.

CLARENCE S. APPLAS, OF MOLINE, ILLINOIS.

VEHICLE TOP SUPPORT AND HOLDER.

1,097,159.  Specification of Letters Patent.  Patented May 19, 1914.

Application filed February 25, 1913. Serial No. 750,609.

*To all whom it may concern:*

Be it known that I, CLARENCE S. APPLAS, a citizen of the United States, residing at Moline, in the county of Rock Island and State of Illinois, have invented a new and useful Vehicle Top Support and Holder, of which the following is a specification.

The invention relates to improvements in vehicle top supports and holders.

The object of the present invention is to improve the construction of vehicle top supports and holders, and to provide a simple, inexpensive and efficient device designed for use on automobiles and other vehicles, and adapted to be readily applied to the same, and equipped with a seat for holding the top when folded and provided also with means for securely retaining a tier of bows to the seat and of effectually preventing the same from being jolted therefrom by the vibrations of an automobile or other vehicle.

A further object of the invention is to provide a vehicle top support and holder having flexible means adapted to connect the top bow of a tier with the seat for the bottom bow, and capable of adjustment to apply the desired pressure to the bows and of being wound within the device so as to be out of the way when not in use.

With these and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention.

In the drawing: Figure 1 is a front elevation of a vehicle top support and holder, constructed in accordance with this invention and shown applied to a vehicle. Fig. 2 is a side elevation of the device. Fig. 3 is a vertical sectional view on the line 3—3 of Fig. 2. Fig. 4 is a vertical sectional view, taken substantially on the line 4—4 of Fig. 3.

Like numerals of reference designate corresponding parts in all the figures of the drawing.

In the accompanying drawing in which is illustrated the preferred embodiment of the invention, the vehicle top support and holder comprises in its construction a bracket or support 1, constructed of suitable metal and consisting of a semicylindrical upper portion 2 and a central depending clamp 3, having a circular opening 4 to receive a horizontally projecting stud 5 of an automobile, or other vehicle and carrying a set screw 6 for engaging the said stud or support. The set screw 6 is mounted in a threaded perforation 7 at one side of the clamp, and it is adapted to secure the support in proper position on the stud 5, shown in dotted lines in Fig. 2 of the drawing. The semicylindrical upper portion 2 presents a concave upper face to and forms a seat for the bottom bow 8 of a vehicle top 9, and in practice the concave surface of the seat may be covered with rubber, leather or any other suitable material to avoid marring the bottom bow 8.

The bows of the vehicle top when folded are arranged in a tier, as illustrated in Fig. 1 of the drawing, and they are securely retained on the seat by means of a flexible connection, preferably consisting of a chain 10 secured at one end to a shaft 11 and provided at its outer free end with a ring 12, adapted to engage with a headed projection 13 extending outwardly from the top bow 14 of the tier. The shaft 11 is mounted in a casing composed of an inner vertical substantially circular plate 15 and a cylindrical shell 16, consisting of an outer vertical plate and an inwardly extending annular rim, fitted against the inner vertical plate 15 and secured to the same by screws 17, or other suitable fastening devices. The screws 17 pierce the inner vertical plate and engage the rim of the cylindrical casing 16. The plate 15 depends from the outer or front side of the seat 2 and is preferably formed integral with the same, and it is provided with a central bearing opening 18 in which is mounted the inner end of the shaft 11. The outer portion of the shaft extends through a central bearing opening 19 of the cylindrical shell, and it is provided with a squared terminal portion 20 on which is mounted an outer combined ratchet and operating plate or disk 21, having a central rectangular opening 22 to fit the squared terminal portion 20 of the shaft and secured on the same by a screw 23, a washer 24 being preferably interposed between the head of the screw and the disk or plate 21.

The annular rim is provided at the top with an opening 25 through which the chain extends and the disk or plate 21, which is of greater diameter than the cylindrical shell, has a scalloped periphery 26 and is provided with an annular series of openings 27, preferably arranged concentric with the scallops and located at the rim of the cylindrical shell and adapted to be engaged by a locking dog or lever 28 of approximately triangular form pivoted to the cylindrical shell at one side thereof by a screw 29, or other suitable fastening device, which pierces the dog or lever at the top. The dog or lever which is curved to conform to the configuration of the cylindrical shell, as clearly illustrated in Fig. 3 of the drawing, has a lower outer corner or portion 30 for engaging the openings of the disk or plate 21, and it is provided with an inwardly extending arm 31, having an outturned portion 32 and engaged by one side or leg 33 of an approximately U-shaped spring 34. The spring 34, which is provided at the bend with a spring coil 35, has its upper side bearing against the underface of the seat 2, and its lower side, which has an outwardly extending terminal 36, engages a notch 37 in the upper edge of the arm 31 of the locking dog or lever 28. The outer engaging portion of the locking dog or lever presents an inclined upper edge and permits the disk 21 to be rotated in one direction for winding up the chain, and the lower side or edge of the lever forms a shoulder for engaging the disk 21 to hold the same against movement in the opposite direction.

In securing a carriage top on the seat, the ring 12 is engaged with the projection 13 and the disk 21 is rotated to partially wind the chain and place the same under the desired tension. When it is desired to raise the vehicle top, the lever is operated to release the disk 21, and the chain is slackened and disengaged from the projection 13. This releases the vehicle top, which may then be raised. The chain is adapted to be rewound on the shaft and when not in use is housed within the cylindrical casing out of the way. The inner end of the chain is linked into an eye 38 of an attaching plate 39, curved to conform to the configuration of the shaft 11 and secured to the same by a screw 40, or other suitable fastening device. The attaching plate is located between the vertical plate of the cylindrical shell and the vertical plate 15 of the support and is adapted to retain the shaft 11 against longitudinal movement.

What is claimed is:—

1. A device of the class described including a support having a seat and provided with means for mounting it on a vehicle, said support being also provided with a casing, a shaft mounted within the casing, a flexible connection extending into the casing and connected with the shaft, means for connecting the outer end of the flexible connection with the carriage top, means arranged exteriorly of the casing for rotating the shaft to wind the said flexible connection thereon, and means for locking the shaft against rotary movement.

2. A device of the class described including a support having a seat and provided with means for mounting it on a vehicle, said support being also provided with a casing, a shaft mounted within the casing, a flexible connection extending into the casing and connected with the shaft, means for connecting the outer end of the flexible connection with the carriage top, an operating disk connected with the shaft and adapted to rotate the shaft, and a locking device arranged to engage the disk for holding the shaft against rotary movement.

3. A device of the class described including a support comprising a seat having means for mounting it on a vehicle and provided at its outer side with a vertical plate, a shell secured to the plate to form a casing, a shaft mounted within the casing, a flexible connection secured at one end with the shaft and adapted to be connected at its other end to a vehicle top, an operating disk or plate mounted on the outer end of the shaft, and a dog or detent arranged to engage the disk or plate.

4. A device of the class described including a support provided with a seat and having a vertical casing at the outer side thereof, a shaft mounted in the casing, a flexible connection secured to the shaft and adapted to be connected with a vehicle top for holding the same on the seat, an operating disk or plate mounted on the outer end of the shaft and extending beyond the casing and provided at the periphery thereof with openings, and a spring actuated dog or lever mounted on the casing and arranged to engage the openings of the disk or plate.

5. A device of the class described including a support provided with a seat and having a vertical casing at the outer side thereof, a shaft mounted in the casing, a flexible connection secured to the shaft and adapted to be connected with a vehicle top for holding the same on the seat, a disk or plate mounted on the outer end of the shaft and provided at the periphery of the casing with an annular series of openings, an approximately triangular locking dog or lever pivotally mounted on the casing and having an outer portion arranged to engage the openings of the disk or plate, said dog being also provided with an inwardly extending operating arm, and a spring mounted on the support and bearing against the operating arm for maintaining the dog or lever in engagement with the disk or plate.

In testimony, that I claim the foregoing as my own, I have hereto affixed my signature in the presence of two witnesses.

CLARENCE S. APPLAS.

Witnesses:
 PAULINE HORMAN,
 LEONARD C. OAKLEY.

Copies of this patent may be obtained for five cents each, by addressing the "Commissioner of Patents, Washington, D. C."